Patented June 28, 1949

2,474,226

UNITED STATES PATENT OFFICE 2,474,226

MAKING LIQUID CARBOHYDRATE-RICH FOODS RESISTANT TO MICROORGANISMS

Gerald H. Coleman, Freeland, and Paul A. Wolf, Midland, Mich., assignors to The Dow Chemical Company, Midland, Mich., a corporation of Delaware No Drawing. Application February 7, 1949, Serial No. 75,068

10 Claims. (Cl. 99—150)

1

This invention relates to a method for imparting to liquid foods rich in carbohydrates an increased resistance to attack by microorganisms such as fungi, yeasts and bacteria, and to the so-treated products. It relates in particular to a method for imparting such increased resistance to sweet syrups and vegetable and fruit juices.

It is a matter of common knowledge and experience that foodstuffs rich in carbohydrates (i. e., those containing 50 per cent or more of carbohydrate based on the total weight of protein plus fat plus carbohydrate) are subject to attack by such varied types of microorganisms as fungi, yeasts and bacteria. The growth of such microorganisms is by no means universally injurious to the foodstuffs, but may give the food an unpleasant appearance or an unnatural flavor which may make the product unsalable or unpalatable to the consuming public. Various materials have been suggested as inhibitors of such uncontrolled growth of microorganisms in foods rich in carbohydrates, but none are as successful as may be desired. Some prior inhibitors are short-lived in their effect, and others require such high concentrations as to be uneconomical. Some are too selective for general use. Others contribute a distinct and undesirable flavor to foods. Some are toxic and cannot be used safely in foods for human consumption. Most of the prior inhibitors modify the pH of the foods, or require particular pH conditions for antimicrobial effectiveness, and this makes them difficult to use and to control.

By way of illustrating the diversity of liquid foodstuffs which are rich in carbohydrates and which are subject to attack by fungi, yeasts and bacteria, the following partial list is given: tomato juice, carrot juice, prune juice, apple juice, grape juice, orange juice, grapefruit juice, chocolate syrup, "hot fudge sauce," sorghum, molasses, maple syrup, corn syrup, glucose, cane sugar syrup, honey, sweetened fruit and root extracts such as cola syrups, root beer syrup, and the like. It is not to be inferred that the foregoing and related foods are invariably attacked and made unacceptable for table use, but it should be understood that each of them is subject to such microbial attack and that the extent of the damage done will depend largely on the history of the particular product concerned, the conditions un-

2 der which it is prepared and stored, and upon the kind and amount of antimicrobial agent, if any, with which it may be treated. In any case, it is desirable that a resistance to attack by microorganisms be imparted to foods rich in carbohydrates, and that the means employed be itself an odorless, tasteless non-injurious edible material.

It is accordingly among the objects of the present invention to provide a method for imparting to foods rich in carbohydrates an increased resistance to attack by microorganisms such as fungi, yeasts and bacteria. A related object is to provide such a method, in which the means employed to impart the said resistance is an odorless material which is tasteless at use concentrations and is both non-injurious to the foods and edible by humans. A particular object is to provide a method for imparting to fruit and vegetable juices and to sweet syrups an increased resistance to microorganisms. Another object is to provide a method of using particular compounds to impart to carbohydrate-rich liquid foods an improved resistance to attack by microorganisms. A further object is to provide carbohydrate-rich liquid foods having improved resistance to such attack.

The present invention is dependent upon the heretofore unknown and surprisingly high antimicrobial properties (as regards organisms whose growth is normally fostered by foods rich in carbohydrates) of the chemical compound known as dehydroacetic acid and its edible salts. Dehydroacetic acid, which has the structural formula

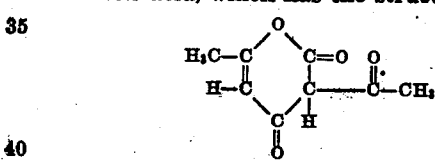

is also known as 3-acetyl 6-methyl pyrandione-2,4, and exists in both a keto and an enolic form. Dehydroacetic acid and its sodium, potassium, ammonium and calcium salts are non-hazardous to humans at use concentrations, and in the amounts usually employed are both tasteless and odorless. They are essentially neutral compounds and do not affect materially the pH of foodstuffs in or on which they are employed in the invention. Dehydroacetic acid is slightly soluble in water and is readily soluble in alkalies and a variety of organic solvents, including ethyl alcohol and the glycols, and may be deposited from or used in such of these solutions as is deemed appropriate for the particular case. Dehydroacetic acid is slightly more effective (i. e., it may be used at slightly lower concentrations) in neutral or acid media than in an alkaline medium, and when high solubility in aqueous media is required, the neutral sodium salt is recommended.

The method of the invention comprises dissolving dehydroacetic acid or one of its edible salts in the liquid, carbohydrate-rich food to be protected. The term "edible salt" as herein used refers to those salts of dehydroacetic acid which may be ingested by humans in the small amounts present in foods containing them, without harmful effect. While the amount of dehydroacetic acid, or salt thereof, to be used may vary considerably, depending on the type of liquid food in which it is to be incorporated, and the conditions and microorganisms which the food may be expected to encounter, a significant measure of resistance to attack is found to be imparted to carbohydrate rich foods through the use of 0.02 to 0.5 per cent of dehydroacetic acid, or of one of one of its salts, based on the weight of the food.

The following specific examples illustrate the practice of the invention, but are not to be construed as limiting the invention either to the foods specifically disclosed or to the microorganisms whose growth is shown to be repressed.

EXAMPLE 1

The antimicrobial spectrum of dehydroacetic acid has been determined to be very comprehensive. In the following table appear the results of tests in vitro to illustrate the relative effectiveness of dehydroacetic acid and some of the previously known antimicrobial agents against a few typical organisms. In each column, the first or left-hand numeral represents the maximum concentration of the antimicrobial agent which allows growth to proceed normally, while the second or right-hand numeral represents the minimum concentration which fully inhibits microbial growth on a suitable nutrient agar medium in a petri dish. Both values are given as a per cent by weight of the medium.

Table

| | Microbistat, Per Cent | | | | | |
|---|---|---|---|---|---|---|
| | Dehydroacetic Acid | Dichloroacetic Acid pH 5 | Calcium Propionate pH 8 | Sodium Propionate pH 8 | Propionic Acid pH 5 | Benzoic Acid pH 6 |
| Penicillium digitatum | 0.01  0.025 | >5.0 ----- | 3.0  5.0 | 3.0  5.0 | 0.1  0.25 | 0.1  0.5 |
| Saccharomyce cerevisiae | 0.01  0.025 | >5.0 ----- | >7.5 ---- | >7.5 ---- | 0.75  1.0 | 0.25  0.50 |
| Penicillium expansum | 0.0075  0.01 | >5.0 ----- | >7.5 ---- | >7.5 ---- | 0.25  0.50 | 0.1  0.25 |
| Aspergillus niger | 0.025  0.05 | >5.0 ----- | >3.0 ---- | 5.0  7.0 | 0.25  0.50 | 0.50  0.75 |
| Lactobacillus plantarum | 0.08  0.10 | 0.5  0.75 | >7.5 ---- | >7.5 ---- | 1.0  2.0 | 0.25  0.50 |
| Rhizopus nigricans | 0.01  0.025 | >5.0 ----- | 5.0  7.5 | 3.0  5.0 | 0.25  0.50 | 0.25  0.50 |

Other organisms of numerous types respond in the same manner, and are controlled at similar concentrations of dehydroacetic acid. These include, for example, Aerobacter aerogenes, Erwinia caratovora, Fusarium oxysporium, Phomopsis citril, Sclerotium rolfsii, Bacillus mesentericus, and the like. The foregoing table shows that dehydroacetic acid is usually at least as effective as ten times its weight of other representative commercial antimicrobial agents. Less of the dehydroacetic acid will be required in any particular application than of the other agents, and in some cases the other agents are not effective at any practical concentration.

EXAMPLE 2

When making apple juice, washed apples are pressed and pectin is commonly added to the juice to assist in clarification. After standing for a few hours, the juice is clarified by filtration in a filter press. The resulting clear juice is usually sealed in a bottle or tin and is pasteurized. Some of the unpasteurized juice was treated with various amounts of the neutral sodium salt of dehydroacetic acid and stored for two days at room temperature and then for 6 months in a refrigerator held at about 45° F. Counts were made of bacteria, yeasts and fungi and comparisons made with the untreated control sample. The results are given in the following table:

| Sodium Salt of Dehydroacetic Acid, Per Cent of Weight of Juice | Bacterial Count (organisms/ml.) | | | Yeast Count | | Fungi Count 3½ months |
|---|---|---|---|---|---|---|
| | Original | 2 days | 3½ months | Original | 3½ months | |
| 0.01 | -------- | $10^3$ | -------- | -------- | -------- | -------- |
| 0.02 | -------- | $10^3$ | 10 | -------- | Innumerable | 0–10 |
| 0.03 | -------- | $10^3$ | 0–10 | -------- | 25–100 | 0–10 |
| 0.05 | -------- | $10^3$ | 0–10 | -------- | 25–50 | 0–10 |
| None | $10^4$ | $10^5$ | -------- | $10^3$ | -------- | -------- |

The untreated control spoiled in 2 days, later forming a surface pellicle and having the strong odor of vinegar. The sample with 0.01 per cent of the preservative agent turned sour in about 2 weeks, while the samples containing 0.02 to 0.05 per cent of that agent remained sweet and palatable for 6 months.

EXAMPLE 3

Commercial samples of a thick chocolate "hot fudge syrup" and of a more fluid chocolate syrup, both of which were sweetened to be predominantly carbohydrate foods, and both of types which are used as ice cream additives, were treated with various amounts of dehydroacetic acid and were exposed to the atmosphere at 85° F. The untreated controls showed considerable mold growth on the exposed surfaces in a week. No such growth appeared in 20 days on the "hot fudge" samples containing 0.05 per cent or more of dehydroacetic acid, or on the chocolate syrup samples containing 0.03 per cent or more of dehydroacetic acid. Samples containing 0.01 per cent of the addition agent had less mold than the controls, but were not adequately protected.

EXAMPLE 4

Various commercial syrups used for sweetening purposes, including corn syrup (glucose), honey, maple syrup, molasses and cane sugar syrup are subject to the growth of contaminating molds. The same is true of the flavoring syrups used in confectionery, in carbonated beverages, and in ice cream products. The addition of 0.025 to 0.05 per cent by weight of dehydroacetic acid to such syrups effectively inhibits such growths and does not affect the flavor of the syrups. Thus, in one series of tests, a commercial molasses was inoculated with a small amount of moldy syrup, and was divided into several portions. One portion was set aside as a control and the others were treated with from 0.01 to 0.1 per cent by weight of dehydroacetic acid. A heavy growth of blue-white mold appeared in the control, while all samples containing 0.025 per cent or more of dehydroacetic acid remained free from mold.

EXAMPLE 5

Various amounts of the neutral sodium salt of dehydroacetic acid were dissolved in several portions of freshly squeezed sweet orange juice. The treated samples and untreated controls were stored at room temperature in closed (but not hermetically sealed) containers. Counts were made of the bacteria and yeast organisms present in the samples before and during the tests. The results appear in the following table. Due to the acidity of the juice, it is presumed that the salt used was converted in solution to dehydroacetic acid.

This application is a continuation-in-part of our copending application, Serial No. 721,877, filed January 13, 1947.

We claim:

1. The method of imparting to liquid foods rich in carbohydrates an increased resistance to attack by microorganisms which comprises dissolving in such food a minor but effective amount of a compound selected from the class consisting of dehydroacetic acid and its sodium, potassium, ammonium and calcium salts.

2. The method of imparting to a fruit juice an increased resistance to attack by microorganisms which comprises dissolving in such food a minor but effective amount of a compound selected from the class consisting of dehydroacetic acid and its sodium, potassium, ammonium and calcium salts.

3. The method of imparting to apple juice an increased resistance to attack by microorganisms which comprises dissolving in such food a minor but effective amount of a compound selected from the class consisting of dehydroacetic acid and its sodium, potassium, ammonium and calcium salts.

4. The method of imparting to orange juice an increased resistance to attack by mircoorganisms which comprises dissolving in such food a minor but effective amount of a compound selected from the class consisting of dehydroacetic acid and its sodium, potassium, ammonium and calcium salts.

5. The method of imparting to a sweet syrup an increased resistance to attack by microorganisms which comprises dissolving in such food a minor but effective amount of a compound selected from the class consisting of dehydroacetic acid and its sodium, potassium, ammonium and calcium salts.

6. A liquid food rich in carbohydrates, containing a sufficient amount of a compound selected from the class consisting of dehydroacetic acid and its sodium, potassium, ammonium and calcium salts to impart thereto resistance to the

| Dehydroacetic Acid, Per Cent of Weight of Juice | Microorganism Counts ||||||||||
|---|---|---|---|---|---|---|---|---|---|---|
| | Initial || 2 Days || 5 Days || 8 Days || 15 Days ||
| | Bact. | Yeast | Bact. | Yeast | Bact. | Yeast | Bact. | Yeast | Bact. | Yeast |
| None (control) | 100 | 520 | 6,800 | 16,500 | 200 | 6,000,000 | Inn. | 920,000 | Inn. | 1,290,000 |
| None (control) | 0 | 0 | 4,700 | 14,100 | 200 | 7,500,000 | Inn. | 810,000 | Inn. | 1,090,000 |
| 0.05 | 0 | 0 | 0 | 0 | 0 | 0 | | | 0 | |
| 0.05 | 300 | 0 | 0 | 0 | 0 | 0 | | | 0 | |
| 0.1 | 0 | 0 | 0 | 0 | 0 | 0 | 0 | | 0 | |
| 0.1 | 0 | 0 | 0 | 0 | 0 | 0 | 0 | | 0 | |
| 0.2 | 0 | 0 | 0 | 0 | 0 | 0 | 0 | | 0 | |
| 0.2 | 0 | 0 | 0 | 0 | 0 | 0 | 0 | | 0 | |
| 0.3 | 0 | 0 | 0 | 0 | 0 | 0 | 0 | | 0 | |
| 0.3 | 0 | 200 | 0 | 0 | 0 | 0 | 0 | | 0 | |

NOTES: "Inn." means innumerable. A blank (----) means no measurement was made.

After only two days, the untreated control samples smelled and tasted "yeasty," and these qualities became more pronounced on long standing. The treated samples remained sweet both in taste and odor over the entire period of the test.

It has been found unnecessary to employ over 0.5 per cent of dehydroacetic acid or of its edible salts to obtain the desired protective action on liquid foods rich in carbohydrates. It is desirable, in most cases to use at least 0.02 per cent of such agent, based on the weight of the liquid food. In any event, the required amount of the protective agents of this invention is minor, and the generally preferred range of 0.02 to 0.5 per cent is not limiting in all cases.

growth of microorganisms.

7. A fruit juice, containing from 0.02 to 0.5 per cent by weight of the sodium salt of dehydroacetic acid.

8. Apple juice, containing from 0.02 to 0.5 per cent by weight of the sodium salt of dehydroacetic acid.

9. Orange juice, containing from 0.02 to 0.5 per cent by weight of the sodium salt of dehydroacetic acid.

10. A sweet syrup, containing from 0.02 to 0.5 per cent by weight of the sodium salt of dehydroacetic acid.

GERALD H. COLEMAN.
PAUL A. WOLF.

(References on following page)

REFERENCES CITED

The following references are of record in the file of this patent:

UNITED STATES PATENTS

| Number | Name | Date |
|---|---|---|
| 2,157,633 | Schapiro | May 9, 1939 |
| 2,229,204 | Boese | Jan. 21, 1941 |
| 2,265,522 | Farkas | Dec. 9, 1941 |
| 2,374,620 | Prinz | Apr. 24, 1945 |

FOREIGN PATENTS

| Number | Country | Date |
|---|---|---|
| 115,695 | Australia | Aug. 6, 1942 |

OTHER REFERENCES

Ind. Eng. Chem., vol. 32, pp. 16–22, 1940, article by A. B. Boese, Jr.